United States Patent
Haney et al.

Patent Number: 6,038,977
Date of Patent: Mar. 21, 2000

[54] MULTIPLE PRINTING PROCESS REGISTRATION METHOD

[76] Inventors: Daniel E. Haney, 9755 Montclaire Dr., Mason, Ohio 45040; Matthew J. Haney, 6381 Beaconwoods Dr., Cincinnati, Ohio 45230

[21] Appl. No.: 09/100,704

[22] Filed: Jun. 19, 1998

[51] Int. Cl.$^7$ ............................................. B41F 1/10
[52] U.S. Cl. ...................... 101/490; 101/129; 101/211; 101/485
[58] Field of Search ................................ 101/114, 129, 101/483, 485, 490, 211, DIG. 36; 235/495; 283/98, 99, 100

[56] References Cited

U.S. PATENT DOCUMENTS

| | | |
|---|---|---|
| 3,913,719 | 10/1975 | Frey ............................................ 101/374 |
| 4,038,123 | 7/1977 | Sammis ...................................... 101/129 |
| 4,505,497 | 3/1985 | Katzman ................................... 101/211 |
| 4,569,584 | 2/1986 | St. John et al. . |
| 4,584,939 | 4/1986 | Giori . |
| 4,656,602 | 4/1987 | Berkland et al. . |
| 4,721,969 | 1/1988 | Asano . |
| 4,876,726 | 10/1989 | Capello et al. . |
| 5,160,938 | 11/1992 | Fargo et al. . |
| 5,315,380 | 5/1994 | Ingraham et al. . |
| 5,416,612 | 5/1995 | Ingraham et al. . |
| 5,434,956 | 7/1995 | Son et al. . |
| 5,460,087 | 10/1995 | Ogorzalek ........................... 101/128.21 |
| 5,481,655 | 1/1996 | Jacobs . |
| 5,494,445 | 2/1996 | Sekiguchi et al. ....................... 434/365 |
| 5,540,146 | 7/1996 | Lapp . |
| 5,592,202 | 1/1997 | Erickson . |
| 5,592,573 | 1/1997 | Eisenbarth et al. . |
| 5,672,020 | 9/1997 | Leonard et al. . |
| 5,682,191 | 10/1997 | Barrett et al. . |
| 5,683,187 | 11/1997 | Tunmore . |
| 5,694,853 | 12/1997 | Stempien ................................ 101/485 |

*Primary Examiner*—Ren Yan
*Attorney, Agent, or Firm*—Wood, Herron & Evans, L.L.P.

[57] ABSTRACT

A method for mounting a substrate having a first image printed thereon on a digital printer to be used to print a second image in a desired alignment with the first image. The first image is printed on the substrate at a first location different from a location of the digital printer. A template is mounted on the digital printer, and then, the digital printer is used to print a second image on the template. Thereafter, the substrate is placed on the digital printer with respect to template, and the first image on the substrate is aligned with the second image on the template. Thereafter, the substrate is secured on the digital printer at a location where the first image on the substrate aligns with the one of the second image on the template. Thus, the digital printer can then be used to print the second image on the substrate in alignment with the first image.

24 Claims, 1 Drawing Sheet

MULTIPLE PRINTING PROCESS REGISTRATION METHOD

BACKGROUND OF THE INVENTION

This invention relates generally to printing processes and more particularly to an improved printer registration process.

The design of packaging for goods, principally, consumer goods, has become increasingly more complex in view of the greater number of types of packages available, the wider range of materials from which packages may be made as well as the properties of the goods to be packaged. A package design must consider how the goods are to be safely transported through distribution channels, presented to the consumer at the retail level and handled by the consumer prior to use. In addition, the package graphics or images are important in attracting the attention of the potential purchaser as well as providing the highest quality presentation of the goods to the consumer. Therefore, it is a common practice to provide high quality package "comp", that is, a color comprehensive or mock-up, of the final package so that it may be perceived as accurately as possible in its final form. Further, since the package comp is not designed for actual use, but simply to visually evaluate the package image, it is desirable to provide the highest quality images on the package material at the least cost.

It is impractical to run a small quantity of packages on the automated printing press line used to manufacture the package on a commercial scale. Therefore, most often, such comps are produced by hand. For purposes of this document, the application of interest are those package comps made of a flexible material in which printing processes that print on flexible substrates are used. Often, a drum-type, large format digital printer is used. Such a printer produces a high quality simulation of the package images.

Package comp designs often specify colors that are identified with respect to a chart of standard colors, for example, a "PANTONE" chart commercially available from Pantone Inc. of Moonachie, N.J. However, not all of those "PANTONE" colors can be reproduced or printed using the digital printer. The digital printer is only capable of printing process colors, that is, those colors that can be produced using the colors in the printer print heads which most often are cyan, magenta, yellow and black. It is generally most efficient to print all of the colors on the package comp with the digital printer, and therefore, every effort is made to provide process colors on the digital printer that match the colors specified in the package design. However, white and a number of "PANTONE" colors, for example, gold, etc., cannot be suitably matched with a process color. In those situations, line colors are used which are generally produced by mixing inks to the desired color. Therefore, in producing such a package comp, it would be desirable to use another printing process to apply the line color in combination with the digital printing process which applies the process color.

In such a process, using a computer workstation, a component or line color digital image file is produced that represents a desired line color portion of the package image, for example, a white or gold, that is not printed with the digital printer. Using that component digital image file, the line color is applied to a package substrate using a conventional printing process, such as a silk screen, printing, offset printing or a direct imaging process. The package substrate having the line color image printed with a conventional printing process must then be mounted on the digital printer with which the remainder of the package image, that is, the process color image, will be printed.

As will be appreciated, any attempts to mount the package substrate on the printer drum utilizing known alignment techniques will not result in the process color image being printed in exact alignment with the previously printed line color image. The known mounting techniques suggest that the substrate be aligned utilizing either the physical edges of the printer drum or alignment guide lines that are printed along the edges of the substrate and thus, outside the printed image itself. As will be appreciated, successfully aligning the edges of the substrate or mutually perpendicular guide lines with the printer drum on do not necessarily result in an alignment of the conventionally printed line color image with a superimposed digitally printed image. While, such misalignment while not great, it is sufficient to distort the visual perception of the image on the package comp. Thus, the package comp is of insufficient quality to accurately represent the appearance of a high quality, mass produced package.

Therefore, currently, only a trial and error process can be used to mount the flexible substrate on the drum of the digital printer, and such trial and error process is time consuming, inefficient and often requires several attempts before an acceptable package comp is produced. Thus, there are no known alignment techniques for easily, efficiently and reliably mounting a conventionally printed flexible substrate on the drum of the digital printer, so that the line color image matches the process color image that is printed with the digital printer.

In addition, if a silk screening printing process is used, the silk screen may stretch slightly during the screening step; and hence, the silk screened line color image on the packaging substrate no longer matches or corresponds exactly with the component digital image file from which the silk screen was created. Further, packaging material requirements now often specify that the package be made from a material that stretches, for example, polyethylene. With a stretchable material, if the line color image is applied by a silk screening process, both the stretchable material and the silk screen are physically and unsymmetrically stretched with the screening step. Consequently, the silk screened image is even further distorted with respect to the component digital image file from which the silk screen was created.

Consequently, there is a need for an alignment or registration system by which a flexible substrate having a first image printed thereon on at a first location can be precisely mounted on a drum of a digital printer at a different location.

SUMMARY OF THE INVENTION

The present invention permits a package comp to be made in which two different images are printed on a common substrate using printing processes at different locations, that is, a first image is printed on the substrate at a first location, and thereafter, a second image is printed on the substrate with a digital printer so that the first and second images are in a desired relationship. The invention is especially valuable in that a conventional printing process, for example, a silk screen printing process, may be used to print a line color image; and thereafter, a digital printer used to print process color images in precise alignment with the silk screened line color image. Thus, the present invention has great value in being able to make use of the advantages of both conventional printing processes and digital printing processes to print related images on a common substrate. The process of the present invention further permits the use of different printing processes with a flexible and stretchable substrate.

According to the principles of the present invention and in accordance with the preferred embodiment, a method is provided for mounting a substrate having a first image printed thereon on a digital printer to be used to print a second image in a desired alignment with the first image. The first image is printed on the substrate at a first location different from a location of the digital printer, and the first image is related to a second image to form a composite image. First, a template is mounted on the digital printer, and then, the digital printer is used to print the second image on the template. Thereafter, the substrate is placed on the digital printer with respect to template, and the first image on the substrate is aligned with the second image on the template. The substrate is then secured on the digital printer at a location where the first image on the substrate aligns with the second image on the template. Thus, the digital printer can then be used to print the second image on the substrate in alignment with the first image to produce a composite image.

In one aspect of the invention, the first image is a line color image that is applied to the substrate with a conventional printing process, and the second image is a process color image that is applied using the digital printer. In another aspect of the invention, the first image is printed on the substrate using a silk screening process, and in a further aspect of the invention, the substrate is made from a stretchable, flexible material.

In another embodiment of the invention, the above mounting process is preceding by a process of printing the first image on a flexible substrate using silk screening process, and after the substrate is mounted on the digital printer using the above mounting process, the second image is printed on the substrate using the digital printer.

In a further embodiment of the invention, the printing of the first image on the flexible substrate is preceded by the creation of a first digital image file of the first image. Further, a second digital image file representing the second image is created and used to print of the second image on the substrate with the digital printer after the flexible substrate has been mounted on the digital printer pursuant to the above described process.

These and other objects and advantages of the present invention will become more readily apparent during the following detailed description taken in conjunction with the drawings herein.

DETAILED DESCRIPTION OF THE INVENTION

Figure 1:
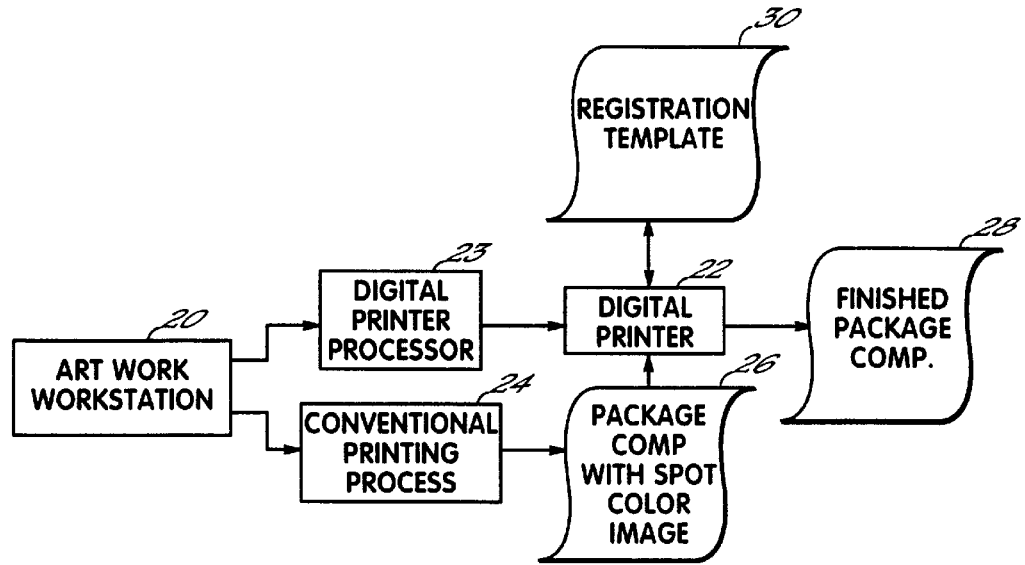
FIG. 1 is a schematic diagram of the elements utilized in the registration process in accordance with the principles of the present invention.

FIG. 1 is a schematic diagram of the elements utilized in the registration of the present invention to produce a desired finished package comp. The package comp applications of most interest are those utilizing flexible materials such as plastic sheets, metalized films and foils, etc. that may be clear, translucent or opaque and are generally 12 mils or less in thickness. Such flexible substrates must be supported during the printing processes. An artwork workstation 20 is used to create the package images to be printed on the package in a known manner. The workstation may be any type of personal computer, for example, a "MACINTOSH" 9600 commercially available from Apple Corporation of Cupertino, Calif. The image processing software in the workstation 20 may be Adobe Illustrator or Adobe Photoshop commercially available from Adobe Corporation of Mountain View, Calif. Other commercially available image processing software may also be used. Often, the composite package image will require colors that cannot be matched to the process colors that are printed by a digital printer 22; and therefore, those line colors must be applied by a conventional printing process 24. Such a conventional printing process 24 uses different apparatus and is not integrated with the digital printer 22. The conventional printing process 24 is physically separate from, that is, at a different location from, the digital printer 22. For purposes of this document, conventional printing processes are defined as nondigital printing processes, for example, offset printing, silk screened printing, direct imaging, etc. The workstation 20 is used to produce a first, component or line color digital image file that is used with the conventional printing process 24 to produce a flexible substrate 26 having the first, component or line color image printed thereon. As will be appreciated, the flexible substrate with the line color image 26 must then be mounted on the digital printer 22 such that the remainder of the package image can be printed thereon. The digital printer 22 includes a control or processor 23 that commands and controls the operation of the printer 22. The digital printer 22 and control 23 may be, for example, a Model 3047 drum-type, large format printer commercially available from IRIS Graphics, Inc. of Bedford, Mass. As earlier discussed, there are no known methods of providing reliable indicia such that the flexible substrate 26 can be mounted on a drum of the digital printer 22 without extensive trial and error. That trial and error process is time consuming and often requires several flexible substrates be printed before a satisfactory one is produced.

The present invention takes advantage of the capability of the digital printer 22 to reliably, repeatably and precisely print an image at the same location with respect to the printer drum time after time. Given that capability, the present invention provides a registration system in which the package comp with the line color image 26 can be easily, efficiently and reliably mounted on the drum of the digital printer 22 such that the digital printer produces a desired finished package comp 28. Thus, the digitally printed process color image on the finished package comp 28 matches as closely as possible the line color image produced by the conventional printing process 24.

With the present invention, there is no attempt to align the flexible substrate with the printer drum, but instead the line color image on the flexible substrate is aligned with a process color image printed with the digital printer. The registration process first requires that a registration template 30 be mounted on the drum of the digital printer 22. The registration template is normally a flexible substrate made of a translucent "MYLAR" polyester material. The artwork workstation 20 is used in a known manner to provide a process color digital image file, that is, a digital image file to be reproduced by the digital printer 22. The process color digital image file is provided to the printer processor 23 which causes the digital printer 22 to print the process color image on the template 30 mounted on the printer drum. Therefore, no image is printed on the template 30 in the area corresponding to the desired location of the line color image. Thereafter, the package comp with the line color image 26 is placed on the drum of the printer 22 with respect to the registration template 30. The package comp 26 may be placed over or under the registration template 30. In the latter application, one or two edges of the registration template 30 are loosened from the surface of the drum of the printer 22, and the package comp 26 is slid beneath the registration template. The package comp 26 is manipulated with respect to the registration template 30 until the line color image on the package comp 26 is precisely aligned with the process color image on the registration template 30. The package comp 26 is then secured to the drum of the printer at its aligned location. If the package comp 26 has been located underneath the registration template 30, the template 30 is then removed from the printer drum and the digital printer processor 23 is again operated to cause the process color image to be printed on the package comp 26. The digital printer 22 will print the process color image on the package comp 26 in precisely the same location at which it printed the process color image on the registration template 30. Therefore, a finished package comp 28 is produced in which the process color image and the line color image are precisely aligned.

To utilize the registration template 30 with other package comps 26, upon initially mounting the registration template 30 on the drum of the printer 22, registration indicia are marked both on the registration template 30 and the drum of the printer 22. Thus, after the template 30 has been removed, the registration indicia on the template 30 and the drum of the printer 22 may be used to remount the registration template 30 on the drum of the printer 22 in precisely the same location. Thus, the same registration template 30 may be used for any number of package comps 26. The above process provides an easy, inexpensive, efficient and repeatable process for mounting a flexible material having a first image printed at a first location on the drum of a digital printer at a second location, thereby permitting the printer to print a second image in alignment with the first image.

Figure 2:
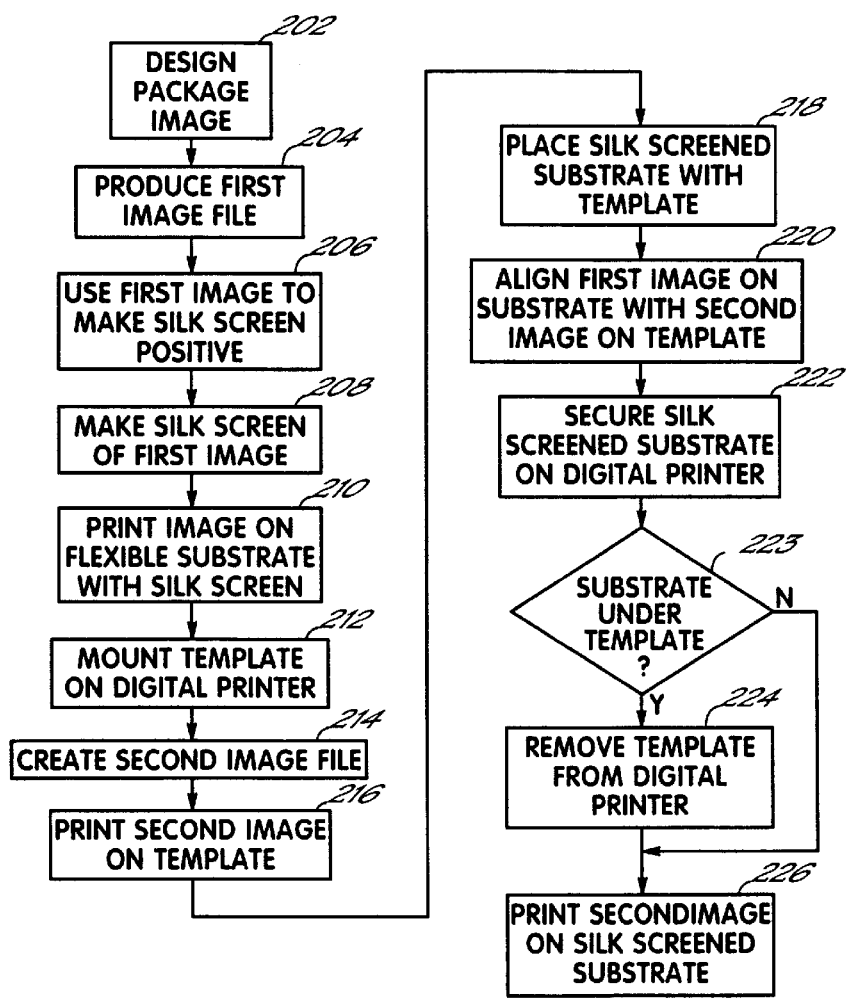
FIG. 2 is a schematic diagram illustrating in more detail one embodiment of the registration process in accordance with the principles of the present invention.

FIG. 2 is a schematic diagram illustrating in more detail the registration process of the present invention. First, at 202, the artwork workstation 20 (FIG. 1) is used to create the package image. In the production of packaging comps, it is very desirable to be able to combine digital printing with the conventional silk screen printing process. Silk screen printing requires a minimal investment, is relatively simple, fast and can be used over a wide range of line colors. However, silk screen printing is a manual process that does not have the same precision and repeatability as a digital printing process. Thus, the concept of matching an imprecise, silk screened image on the same substrate with a very precise digitally printed image to produce a high quality composite package image would be rejected by most people who are knowledgeable and skilled in the printing arts.

Therefore, at 204, the artwork workstation is used to create a first, component or line color digital image file which is to be used by the conventional printing process 24 to print the line color on the flexible substrate. In a known manner, the line color image is trapped and removed from the package digital image file. As part of the trapping process, the line color image may be slightly expanded or reduced so that there is a proper fit of the digital printed image onto the silk screen image. The size of the overlap, the colors to be used in the overlap and the direction of the overlap will vary depending on the nature of the image itself, the colors involved and the process. Thus, the specifications for the trapping process are generally based on the experience of the individual and their particular preferences.

As shown at 206 in FIG. 2, the first step of the silk screening process is to use the first, line color digital image file to make a silk screen positive. Commercially available image setters can be purchased from Agfa, Dupont and others for this purpose. An image setter exposes an emulsion to light, for example, laser light, over an area defined by the line color image. Next, at 208, the silk screen positive is treated with a processor that chemically washes all emulsion from the positive except the exposed area of the emulsion, that is, the area of the line color image. Thereafter, the positive is exposed to ultraviolet light and the area on the silk screen outside of the exposed emulsion area hardens leaving the unexposed area porous.

At 210, the silk screen is then used to print the first, line color image on the flexible substrate. During the silk screen printing process, an ink spreader is drawn over the silk screen with a positive pressure, thereby forcing ink through the silk screen over the area represented by the line color image. During the drawing step, the silk screen experiences a slight stretch in the direction of the draw down. While the magnitude of the stretch is small, it will vary over the silk screen in the direction of the silk screen draw. Consequently, the line color image printed on the flexible substrate differs from and does not correspond with the image represented by the line color digital image file in the computer. Further, the variation of the silk screen image from the desired line color image is unsymmetrical, nonpredictable with precision and nonrepeatable. As will be appreciated, any attempts to mount the silk screened substrate on the drum of the digital printer and thereafter, print the process color image on the flexible substrate so that it precisely matches the line color image would be extraordinarily difficult. Not only does the silk screened image differ from the desired line color image in the computer, but the process of locating the flexible substrate on the printer drum is fundamentally a time consuming, inefficient and wasteful trial and error process. Consequently, the ability to utilize conventional and digital printing processes in combination to provide a high quality package comp is extraordinarily difficult and expensive.

With the present invention, at 212 of FIG. 2, a registration template, preferably made of a translucent "Mylar" polyester material is mounted on the drum of the digital printer in a normal manner. For example, the template is taped to the drum at several locations along each of the four template edges. Thereafter, at 216, the digital printer processor 23 is utilized to operate the printer 22 to print the second, process color image on the registration template. Thus, there is no printing on the template over the area of the line color image. Next, at 218, the packaging comp with the line color image 26 is placed with the registration template 30 on the drum of the printer 22. The nature of the relationship between the silk screen substrate 26 and the registration template 30 will depend on the particular package image.

In some applications, the package requires that the flexible image substrate be an opaque material, for example, a metalized film, and therefore, it is preferable that the registration template 30 be translucent and placed over the substrate 26. In those applications, the tape holding down one or more edges of the template 30 is cut at the edge of the template, thereby permitting the edges of the template 30 to be lifted from the drum. The flexible substrate 26 is then slid beneath the template 30 and over the drum of the printer 22. The substrate 26 is manipulated to a location at which the line color image on the substrate 26 aligns precisely with the process color image printed on the registration template 30. Thereafter, at 222, the silk screened substrate is secured by tape to the drum of the printer 22, and at 224, the registration template 30 is removed from the digital printer 22.

In other applications, the packaging image may require a translucent or transparent flexible packaging material. In that case, at step 218 of FIG. 2, the silk screened substrate 26 is placed over the registration template 30, and at 220, the substrate 26 is manipulated until the line color image is precisely aligned with the process color image on the template 30. Then, at 222, the substrate 26 is taped to the printer drum.

In both of the applications described above, the process ends with the printer processor 23 being activated to cause the digital printer 22 to print the second, process color image on the flexible substrate 26 that has been mounted to the drum of the printer 22. Since the digital printer has the characteristic of being able to repeatably print the same image at precisely the same location on the drum of the printer 22, the process color image will be printed on the silk screen flexible substrate 26 at precisely the same position that it was printed on the flexible substrate 30. Consequently, a finished package comp 28 is produced in which the line color image is precisely aligned with the process color image.

The above process has the further advantage of not only permitting a digital printing process to be combined with a conventional printing process to produce a finished package image, but further, the registration process permits a package comp to be made from a stretchable and flexible substrate. The stretchable substrate presents further problems with respect to the conventional silk screening process, not only will the drawing pressure distort the silk screen itself and thus, the silk screen image, but the drawing process will also distort the stretchable substrate. Further, such distortion is unsymmetrical and unpredictable. Consequently, line colors that are silk screened onto a flexible and stretchable substrate are different with each substrate and even more difficult to mount on the drum of a digital printer absent the registration process of the present invention.

A further problem exists when using a nonstandard printing stock, for example, polyethylene, with a digital printing process that is primarily designed to print on a paper based stock. The ink from the digital printer will not normally adhere to the chroma treated or dyne side of the polyethylene. Normally, the ink simply breaks into microscopic bubbles and spreads over a large area of the polyethylene substrate, thereby seeming to disappear. To overcome that problem, the polyethylene is treated with a commercial ink jet receiver. However, prior to the ink jet receiver, the polyethylene is coated with a lacquer to etch the surface, thereby providing a bonding surface for the ink jet receiver. Coating the polyethylene with lacquer presents its own problems in that the edges of the polyethylene tend to buckle and warp and curl over the sheet itself. Such a curled sheet is difficult, if not impossible, to easily work with in the subsequent process steps. Therefore, to provide peripheral support for the polyethylene sheet during the coating processes, a strip of adhesive tape is applied as a border to the lower surface of the polyethylene sheet.

The above registration process utilizes two important principles. First, obtaining the desired alignment between two images printed at different locations is best achieved by aligning the images themselves versus attempting to mechanically align the substrate having the first image with a second printing device. Second, a digital printer will, time after time, accurately reproduce the same image at the same location on the drum of the printer with no perceptible deviation. Therefore, first printing the second image on a template and then aligning the first image on the substrate with the second image on the template, permits the substrate to be mounted at a location at which the digital printer will reprint the second image at the desired location with respect to the first image.

Thus, the present invention has the advantage of using a relatively imprecise, inexpensive but fast and effective silk screening process to print a wide range of line color images with a very precise and repeatable digital printer for printing the process color images. The result is a high quality package image on a package comp that closely resembles a package that would be printed on printing equipment that is used to produce the consumer packaging.

While the invention has been illustrated by the description of one embodiment and while the embodiment has been described in considerable detail, there is no intention to restrict nor in any way limit the scope of the appended claims to such detail. Additional advantages and modifications will readily appear to those who are skilled in the art. For example, while the example of FIG. 2 describes the use of a silk screening process, other conventional printing processes, for example, offset printing and direct imaging processes may be used.

Therefore, the invention in its broadest aspects is not limited to the specific details shown and described. Consequently, departures may be made from the details described herein without departing from the spirit and scope of the claims which follow.

What is claimed is:

1. A method of printing first and second images on a stretchable flexible substrate using successive silk screening and digital printing processes, the method comprising:

printing a first image on the stretchable flexible substrate using a silk screen and producing a first image on a stretched flexible substrate, the first image caused by the silk screen and the stretchable flexible substrate stretching during printing;

mounting a template material on a drum of a digital printer;

printing a second image on the template material with the digital printer, the first and second images being related to form a composite image;

placing the stretched flexible substrate on the drum of the printer with respect to the template material;

aligning the stretched flexible substrate in a desired position so that the first image on the stretched flexible substrate is in alignment with the second image on the template material;

mounting the stretched flexible substrate on the drum of the digital printer at the desired position; and printing the second image on the stretched flexible substrate using the digital printer, whereby the first image and the second image are aligned.

2. A method of mounting a substrate having a first image printed thereon on a digital printer to be used to print a second image in a desired alignment with the first image, the first image being printed on the substrate at a first location different from a location of the digital printer, the first image being related to a second image to form a composite image, the method comprising:

mounting a template on the digital printer;

printing one of a second image and a composite image on the template using the digital printer;

placing a substrate on the digital printer with respect to the template;

aligning a first image on the substrate with the one of the second image and the composite image printed on the template; and securing the substrate on the digital printer at a location where the first image on the substrate aligns with the one of the second image and the composite image on the template, whereby the second image may be printed by the digital printer on the substrate in alignment with the first image to produce a composite image.

3. The method of claim 2 wherein the template is a translucent material, the method further comprising:
   placing the substrate on the digital printer under the template; and
   after the substrate is secured at the location on the digital printer, removing the template from the digital printer.

4. The method of claim 3 further comprising:
   lifting an edge of the template; and
   sliding the substrate beneath the template.

5. The method of claim 2 wherein the substrate is a translucent substrate, the method further comprising placing the substrate on the digital printer over the template.

6. The method of claim 2 further comprising mounting the template on a drum of the digital printer.

7. The method of claim 6 further comprising printing the second image on the template using the digital printer.

8. The method of claim 6 further comprising printing the composite image on the template using the digital printer.

9. A method of mounting a flexible substrate having a first image printed thereon on a digital printer to be used to print a second image in a desired alignment with the first image, the flexible substrate having a first image printed thereon by a silk screening process, the first image being related to a second image to form a composite image, the method comprising:
   mounting a template on a drum of a digital printer;
   printing one of a second image and a composite image on the template using the digital printer;
   placing a flexible substrate on the drum of the digital printer with respect to the template;
   aligning a silk screened first image on the flexible substrate with the one of the second image and the composite image printed on the template; and
   securing the flexible substrate on the drum of the digital printer at a location where the first image on the flexible substrate aligns with the one of the second image and the composite image on the template, whereby the second image may be printed with the digital printer on the flexible substrate in alignment with the first image to produce the composite image.

10. A method of mounting a stretchable, flexible substrate having a first image printed thereon on a digital printer to be used to print a second image in a desired alignment with the first image, the stretchable flexible substrate having a first image printed thereon by a silk screening process that produces a first image on a stretched flexible substrate, the first image being related to a second image to form a composite image, the method comprising:
   mounting a template on a drum of a digital printer;
   printing one of a second image and a composite image on the template using the digital printer;
   placing the stretched flexible substrate on the drum of the digital printer with respect to the template;
   manually aligning a first image on the stretched flexible substrate with the one of the second image and the composite image printed on the template; and
   securing the stretched flexible substrate on the drum of the digital printer at a location where the first image on the stretched flexible substrate aligns with the one of the second image and the composite image on the template, whereby the second image may be printed with the digital printer on the stretched flexible substrate in alignment with the first image to produce the composite image.

11. A method of printing first and second images on a flexible substrate using successive silk screening and digital printing processes, the method comprising:
   printing a first image on the flexible substrate using a silk screen and producing a first image on the flexible substrate caused by the silk screen stretching during printing;
   mounting a template material on a drum of a digital printer;
   printing a second image on the template material with the digital printer;
   placing the flexible substrate on the drum of the printer with respect to the template material;
   aligning the flexible substrate in a desired position so that the first image on the flexible substrate is aligned with the second image on the template material;
   mounting the flexible substrate on the drum of the digital printer at the desired position; and
   printing the second image on the flexible substrate using the digital printer, whereby the first image and the second image are aligned.

12. The method of claim 11 wherein the template is a translucent material, the method further comprising:
   lifting an edge of the template;
   sliding the stretched substrate beneath the template; and
   removing the template material from the drum of the digital printer after mounting the flexible substrate on the drum of the digital printer at the desired position.

13. The method of claim 11 wherein the flexible substrate is a translucent substrate, the method further comprising placing the flexible substrate on the drum of the digital printer over the template.

14. A method of printing first and second images on a flexible substrate using a first printing process and a successive digital printing process, the method comprising:
   creating a first digital image file representing only the first image;
   printing the first image on the flexible substrate with a first printing process in response to the first digital image file;
   mounting a template material on a drum of a digital printer;
   creating a second digital image file representing only the second image;
   printing the second image on the template material with the digital printer;
   placing the flexible substrate on the drum of the digital printer with respect to the template material;
   aligning the flexible substrate in a desired position in which the first image on the flexible substrate is in alignment with the second image on the template material;
   mounting the flexible substrate on the drum of the digital printer at the desired position; and
   printing the second image on the flexible substrate using the digital printer in response to the second digital image file, thereby producing the composite image on the flexible substrate in which the first image and second images are aligned.

15. The method of claim 14 further comprising:
   producing a silk screen positive of the first image with the first digital image file;

producing a silk screen of the first image using the silk screen positive; and printing the first image on the flexible substrate using the silk screen.

16. The method of claim 14 wherein the template is a translucent material, the method further comprising:

lifting a portion of the translucent template material from the drum of the digital printer;

sliding the stretched substrate between the translucent template material and the drum of the digital printer; and removing the template material from the drum of the digital printer after mounting the flexible substrate on the drum of the digital printer at the desired position.

17. The method of claim 14 wherein the flexible substrate is a translucent substrate, the method further comprising placing the substrate on the digital printer over the template.

18. The method of claim 14 further comprising printing the second image on the template material in response to the second digital image file.

19. The method of claim 14 further comprising creating the first digital image file with the first image expanded.

20. The method of claim 14 further comprising creating the first digital image file with the first image contracted.

21. The method of claim 14 further comprising creating a composite digital image file including the first and second images.

22. The method of claim 21 further comprising printing the second image on the template material in response to the composite digital image file.

23. A method of printing first and second images on a flexible substrate using successive silk screening and digital printing processes, the method comprising:

creating a composite digital image file including the first and second images;

creating a first digital image file representing only the first image;

producing a silk screen positive of the first image with the first image;

producing a silk screen of the first image using the silk screen positive;

printing a first image on the flexible substrate using the silk screen, the first image being caused by distortions in the silk screen occurring during the printing process, and the first image differing in some dimension from the first image represented by the first digital image file;

mounting a template material on a drum of a digital printer;

creating a second digital image file representing only the second image;

printing the second image on the template material with the digital printer;

placing the flexible substrate on the drum of the digital printer with respect to the template material;

aligning the flexible substrate in a desired position so that the first image on the flexible substrate is aligned with the second image on the template material;

mounting the flexible substrate on the drum of the digital printer at the desired position; and printing the second image on the flexible substrate using the digital printer in response to the second digital image file, thereby producing the composite image on the flexible substrate in which the first image and the second image are aligned.

24. A method of printing first and second images on a stretchable flexible substrate using successive silk screening and digital printing processes, the method comprising:

creating a composite digital image file including the first and second images;

creating a first digital image file representing only the first image;

producing a silk screen positive of the first image with the first image;

producing a silk screen of the first image using the silk screen positive;

printing the first image on the stretchable flexible substrate using the silk screen to provide a first image on a stretched flexible substrate, the first image caused by the silk screen and the stretchable flexible substrate stretching during printing, and the first image differing in some dimension from the first image represented by the first digital image file;

mounting a template material on a drum of a digital printer;

creating a second digital image file representing only the second image;

printing the second image on the template material with the digital printer;

placing the stretched flexible substrate on the drum of the digital printer with respect to the template material;

aligning the stretched flexible substrate in a desired position so that the first image on the stretched flexible substrate is aligned with the second image on the template material;

mounting the stretched flexible substrate on the drum of the digital printer at the desired position; and printing the second image on the stretched flexible substrate using the digital printer in response to the second digital image file, thereby producing the composite image on the stretched flexible substrate in which the first image and the second image are aligned.

* * * * *